United States Patent

Rajagopal

[11] 4,083,356
[45] Apr. 11, 1978

[54] SOLAR ENERGY APPARATUS

[75] Inventor: Ramamoorthy Rajagopal, Brown Deer, Wis.

[73] Assignee: Johnson Controls, Inc., Milwaukee, Wis.

[21] Appl. No.: 715,679

[22] Filed: Aug. 19, 1976

[51] Int. Cl.² ............................. F24J 3/02; G02B 5/23
[52] U.S. Cl. ................................... 126/270; 126/271; 350/331; 237/1 A; 136/89 PC
[58] Field of Search ............................... 126/270, 271; 350/160 R, 160 LC; 237/1 A; 136/89 PC

[56] References Cited

U.S. PATENT DOCUMENTS

| 2,030,350 | 2/1936 | Bremser | 126/271 |
|---|---|---|---|
| 2,595,905 | 5/1952 | Telkes | 126/270 |
| 3,898,977 | 8/1975 | Draper | 126/200 |
| 3,987,780 | 10/1976 | Nozik et al. | 126/271 |
| 4,005,032 | 1/1977 | Hass et al. | 350/160 LC |

*Primary Examiner*—William F. O'Dea
*Assistant Examiner*—Larry Jones
*Attorney, Agent, or Firm*—Andrus, Sceales, Starke & Sawall

[57] ABSTRACT

A flat solar collector apparatus includes an inner energy absorber plate having a absorber surface and energy transfer passageway connected to a storage unit. A transparent cover is secured in outwardly spaced and sealed relation to the absorber plate to define a sealed air space therebetween. The cover includes a pair of stacked, transparent sheets having light transmitting conductive coatings on the opposed sides or faces. Each conductive coating is provided with an electrical connector means for connection to a suitable power supply with an insulating spacer located between the outer peripheries defining a chamber filled with nematic liquid crystals. A D. C. or A. C. voltage source connected to the coatings controls the light scattering characteristic of the crystals and thereby changes the cover from a normally highly transparent to an increasingly translucent state, and thereby the energy transmittance of the cover. The voltage can be controlled manually or in accordance with a desired parameter of the energy collecting system to prevent damaging temperatures in the system. Metal oxide coatings on a collector cover also directly function to increase the absorber temperature for a given solar energy input.

14 Claims, 2 Drawing Figures

SOLAR ENERGY APPARATUS

BACKGROUND OF THE INVENTION

This invention relates to a solar energy system and particularly to a unique collector apparatus having an integrated means for controlling of the temperature of the collector and thereby preventing damaging high temperature conditions in the collector and the system.

Solar collector apparatus to collect and transmit the energy of the sun for useful purposes has been suggested for many years. With the recent increases in the cost of energy and the realization of the finite nature of natural energy resources, interest in the practical collection and use of solar energy has significantly increased. Generally, solar energy transfer systems employ an external collector means exposed to the solar radiation in combination with a circulating transfer means for circulating a transfer medium, such as a suitable liquid, and thereby transferring of solar energy from the collector to a storage means. A conventional and relatively well-developed collector unit or apparatus is the flat plate solar collector in which a pair of parallel plates define an energy entrapment source or chamber, with the inner plate including a suitable absorber. A transfer mechanism is coupled to the inner collector plate for transfer of the trapped solar energy from the collector. Generally, the inner plate has a suitable coated surface for increasing the energy absorption efficiency. The system may operate with periods of relatively low liquid flow during periods of low load demand and even periods of non-circulation and high insolation if the storage unit becomes fully charged. During such periods, the absorber surface continues to absorb the solar energy and the surface may reach exceedingly high temperatures above ambient. For example, a temperature of 400° F. above the ambient temperature is possible under long periods of high insolation. Such temperatures can rapidly cause degradation in the coating on the absorber and even cause sufficient thermal stress within the collector resulting in breakage of the glass covered assembly. As such problems are well-known, various protective methods have been proposed. The collector flow system may, for example, be provided with a vent means for venting of steam which is generated in the collector transfer tubing. Although this results in a reduction in the temperature, make-up liquid must be provided upon reestablishment of normal system operation. This requires the necessary complex make-up source and controls as well as increasing the cost of providing of appropriate liquid. An alternative means which minimizes the liquid loss includes provision of an expansion tank connected to the collector system through a suitable pressure release connection. The tank serves as a reserve storage element for any expanded vapor or liquid under increased temperature conditions. Although it prevents excessive loss of collector fluid, it also requires additional components and controls and may not efficiently maintain the temperature at a desired level. Other systems have suggested suppression of vapor formation by creating of a high pressure flow system. This system may also employ an expansion tank with regulated gas pressure applied to the top of the expansion tank thereby maintaining the desired high pressure operation. Although the high temperature condition may be minimized, the apparatus obviously requires a relatively complex overall system.

Although the prior art thus includes various means for minimizing the creation of damaging high temperature conditions in the solar collector, such systems generally are based upon dissipation of collected energy with additional controlled components. There is a need for a relatively simple and reliable control for solar collectors and particularly flat plate solar collectors.

SUMMARY OF THE PRESENT INVENTION

The present invention is particularly directed to a solar collector means having an integrated transmitting control means forming an integrated part of the solar collector means. Generally, in accordance with the concept and teaching of the present invention, the collector energy absorbing means is covered with a variable energy transmittance layer having control means for varying of the energy transmittance characteristic of the layer, thereby permitting control of the solar energy applied to the absorber surface. The control means of course is preferably selected to consume minimal energy.

In accordance with a particularly unique and novel feature of the present invention, the variable transmittance layer is formed by a liquid crystal material such as a nematic mixture having dynamic scattering properties. The transmittance of such material is responsive to and conveniently controlled by application of a suitable low voltage across the material. The reflecting characteristic or scattering characteristic of a nematic mixture is well-known to be directly controlled by the electric field across the liquid crystal material. For example, such materials have been suggested for generating of light and dark areas in a display apparatus. However, the present inventor has realized that the characteristic of the liquid crystal material in combination with a suitable power supply is such that it maybe incorporated in a solar energy collector means as a highly effective variable transmittance control to modulate and control the solar energy transferred to the solar collector. The power consumed to convert a suitable liquid crystal material from a transparent to a suitable opaque or reduced transmittance state may be on the order of microwatts per square centimeter. This very low power consumption particularly adapts the control to efficient solar energy control regulation.

More particularly, in a particularly unique embodiment of the present invention, a flat plate solar collector apparatus is constructed with an inner absorber plate having a conventional solar abosrber surface layer applied thereto. A transparent cover plate is secured in outwardly spaced and sealed relation to the absorber plate to define a sealed air space therebetween. In accordance with a preferred embodiment of the present invention, the outer cover is uniquely formed of a pair of stacked, transparent sheets having light transmitting conductive coatings on the opposed sides or faces. Each conductive coating is provided with an electrical connector means for connection to a suitable power supply. A thin insulative spacer is located about the periphery between the two covered cover sheets to define a relatively shallow chamber which is filled with a liquid crystal material of the dynamic scattering type. The layered glass cover is then secured in any suitable manner to form a complete flat plate collector unit. Application of either a D.C. or a low frequency A.C. voltage above the treshold level of the liquid crystal material results in a controlled increase in the light scattering characteristic of the material with increasing voltage.

Thus, the liquid crystal is normally highly transparent. As the voltage is increased above the treshold level, the material changes from the normal transparency to and increasingly translucent characteristic and finally reaches a state which is associated with the highest possible reduction in transmitted solar radiation and the precise change depends on the scattering character. This occurs generally, for example, at 60 HZ and at the order of forty volts with presently known liquid crystal material of the dynamic scattering type.

In accordance with the present invention, an appropriate voltage is applied to vary the transmittance and hence the gain or loss at the collector abosrber surface for controlling of the solar energy collected. The voltage can, of course, be controlled in accordance with a desired parameter of the energy collecting system. For example, a temperature sensitive controller could be connected to respond to the temperature of the liquid from the collector, the temperature of the absorber surface or the like. Alternatively, a controller may be constructed to respond to other predetermined characteristics including failure of one or more parts of the system such as a circulating pump, and energy storage or transfer mechanism or the like. A very simple control would include a manual on-off switch means or a similar on-off time control to initiate and terminate circulation at predetermined or adjustably preset periods. The metallic oxide film on a cover sheet also functions to increase the absorber temperature and may be separately used to provide a more efficient collector system.

The present invention thus provides a simple, reliable and relatively inexpensive means of monitoring and controlling the energy collection in a solar collector system to prevent or eliminate possible damaging or undesirable temperature and operating conditions in a solar collector apparatus.

BRIEF DESCRIPTION OF THE DRAWING

The drawing furnished herewith illustrates a preferred embodiment of the present invention in which the above advantages and features are clearly disclosed as well as others which will be readily understood from the following description of the illustrated embodiment.

In the drawing.

DESCRIPTION OF THE ILLUSTRATED EMBODIMENT

Figure 1:
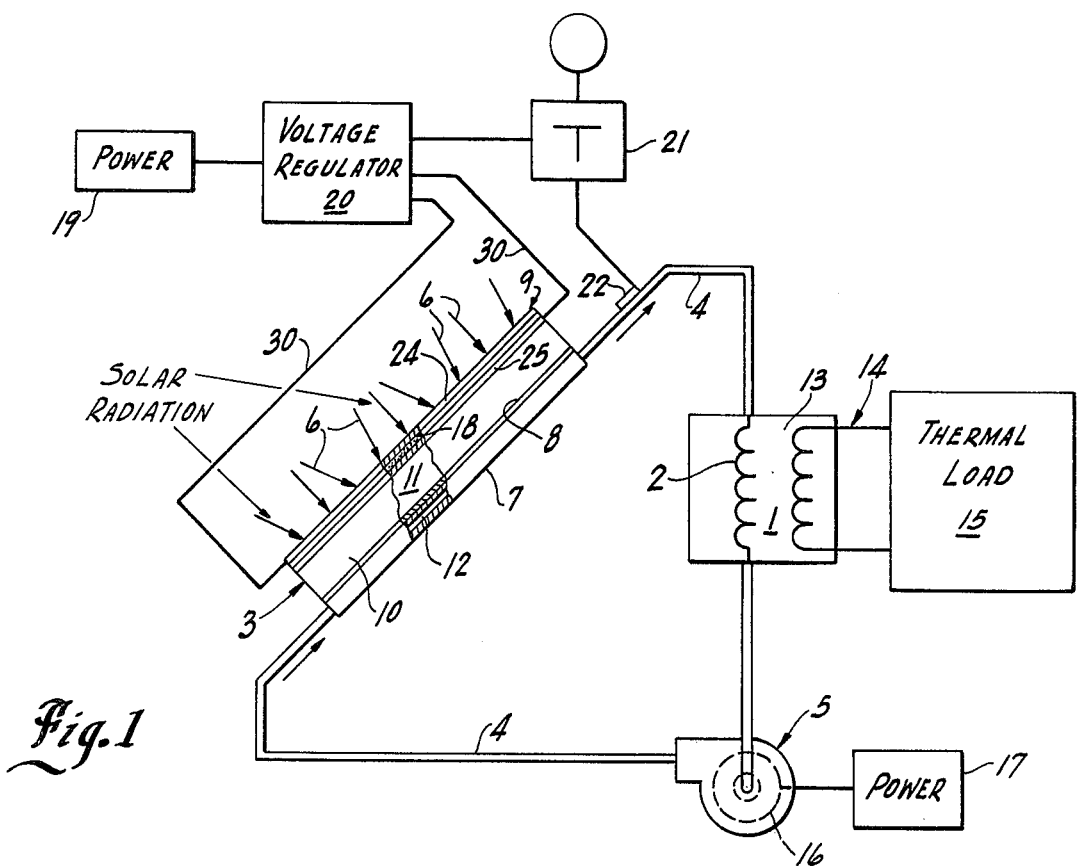
FIG. 1 is a schematic illustration of a solar energy collecting system employing a flat plate solar collector unit constructed in accordance with the present invention.

Referring to the drawing and particularly to FIG. 1, the present invention is shown applied to a relatively well-known solar energy collecting system including a thermal storage unit 1 shown as a storage tank having an input coil 2 located therein and connected in series with a solar energy collector unit 3 through a suitable circulating conduit or line 4. A circulating pump 5 is connected in the line 4 to provide controlled circulation of a heat transfer liquid through the solar energy collector unit 3 and the storage tank 1. The illustrated solar energy collector unit 3 is generally of a rectangular, flat-plate construction and is mounted to collect the solar energy shown diagrammatically at 6. Generally, collector unit 3 includes an inner collector plate element 7 having an outer coating or layer 8 of a suitable solar energy absorbing material which effectively and efficiently absorbs the incoming energy 6. An outer cover 9, which particularly forms one embodiment of the present invention, is secured to the collector plate element by a spacing sidewall 10 to define a stagnant air chamber 11 therebetween to more effectively trap the solar energy for absorption by the layer 8. A plurality of conduits or other passageways 12 is provided within the collector plate 7 and heat transfer medium, such as water or water-anti-freeze mixture. The energy absorbed in the layer 8 is thereby transferred to the thermal storage unit 1. The thermal storage unit 1 may be of any suitable well-known construction. For example, a very simple storage unit includes an insulated hot water tank with the input coil 2 connected in series with the collector unit. The coil 2 serves to heat the water 13 in the tank 1. An output conduit or line 14 is connected to withdraw the heated water 13 from water tank for use directly or by a thermal energy load 15.

The circulating pump 5 may be any suitable well-known device having a driving motor 16. A pump control 17 is preferably suitably coupled to the motor 16 for controlling circulation of the transfer liquid through the energy transfer line 4 and the collector passageway 12. Generally, the circulating pump 5 may be operated in accordance with the load demand, the differential temperature of the collector and the storage unit 1 or the like. As a result, there may be periods of low rates of flow through the transfer conduit 4 and passageway 12 and even periods of no flow and essentially high insolation of the collector unit 3. During such periods the solar energy collector unit 3, of cource, tends to maintain the transmission of solar radiation 6 to the collector absorber layer 8. In accordance with the present invention, the collector unit 3 is formed with an integrated variable transmittance means, the transmittance of which can be controlled electrically.

In the illustrated embodiment of the invention, the variable transmittance means includes a layer of material 18 incorporated into cover 9 and connected to an electrical power source 19. Preferably, a voltage regulator 20 is provided for applying of a closely regulated voltage across the layer 18. The level of voltage applied is controlled by a suitable controller 21 having a termperature sensor 22 coupled in line 4 to the discharge side of the collector unit 3 or could be based on the absorber surface temperature. Generally, as the sensed temperature increased above a preset desired level, the output of the sensor 22 provides a corresponding signal to the temperature controllor 21, which in turn varies the output of the voltage regulator 20 to apply a related control voltage to the material layer 18. The control voltage preferably changes directly with the characteristic of the sensed temperature above a selected normal level.

The details of the particular loop system, the plate construction as well as the particular temperature sensor and voltage regulator may be in accordance with any well-known or desired construction or design. As suitable elements are readily available and will be found in the prior art, no further description thereof is given other than is necessary to clearly describe the illustrated embodiment shown by the unique outer cover 9 of the collector unit 3.

Figure 3:
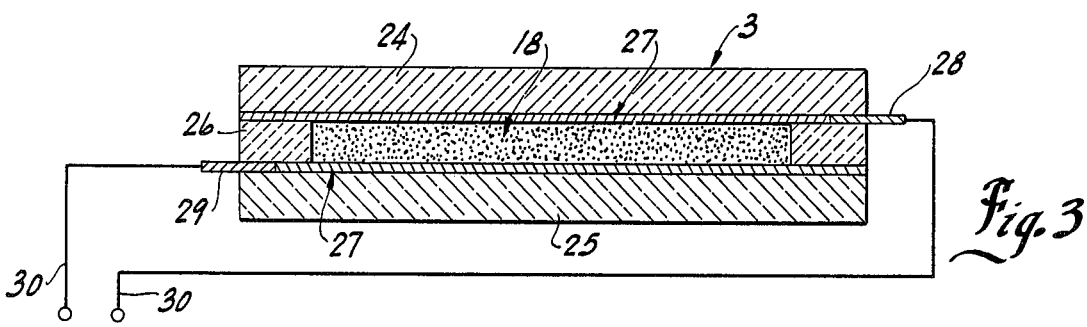
FIG. 3 is an enlarged side elevational view of the solar collector apparatus with parts broken away and sectioned to show inner details of construction.
Figure 2:
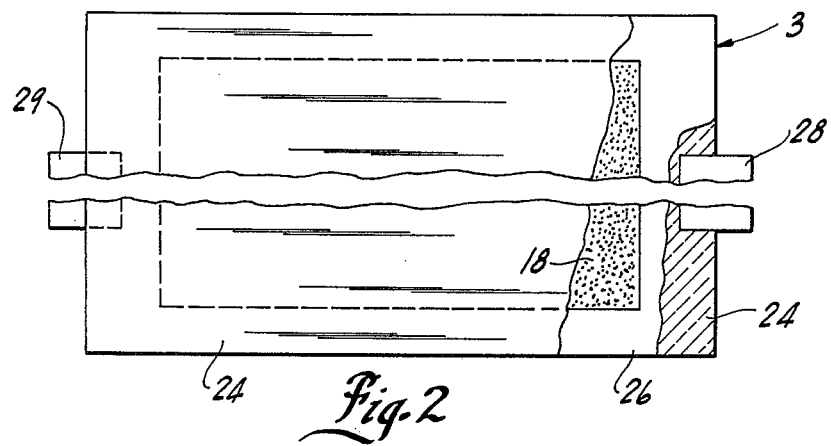
FIG. 2 is a planned view of the solar collector apparatus shown in FIG. 1.

Referring particularly to FIG. 3, the illustrated outer cover 9 includes a pair of transparent sheets 24 and 25 which are formed of glass, plastic or other suitable energy transparent material and receptive to electrically conductive coating application. The transparent sheets 24 and 25 generally have a configuration corresponding to that of the collector unit 3 and are mounted in slightly spaced relation to each other by an insulating space 26 to define a relatively shallow chamber between the two plates. The opposed surfaces of the plates 24 and 25 are coated with an electrically conductive thin layer or coating 27 which is transparent to solar energy 6. For example, commercially available material would include tin oxide, indium oxide or the like each of which can be readily applied as a relatively thin, transparent coating to glass sheets. The spacer 26 may be formed of a plastic such as that manufactured and sold under the trademark TEFLON. The chamber between the conductively coated sheets 24 and 25 is filled with the material 18 such as a liquid crystal fluid. Generally, material 18 is any suitable material having an energy transmittance characteristic which can be controlled by application of an electrical signal to the material. Nematic mixture materials have dynamic scattering properties which vary in accordance with a voltage impressed across the material is particularly suitable. Such materials include liquid crystals operating in the dynamic scattering mode and which are commercially available, such as the Eastman Kodak Company of Rochester, New York. The plates 24 and 25 are formed with oppositely located edge portions incorporating electrical bus bars 28 and 29 suitably attached to the sheets 24 and 25 and projecting outwardly from the peripheral edge to define circuit terminals or connectors. Voltage regulator lead 30 are connected one each to each of the bars 28 and 29 to place a potential or voltage across material 18. The output of the voltage regulator is either a suitable A.C. voltage conveniently at 60 Hertz, or even a D.C. voltage which is adapted to provide an operate range from 0 to about 40 volts. As the voltage is increased to a threshold voltage typically of the order of 5 to 10 volts depending on the type of liquid crystal material used the dynamic scattering effect is initiated within the liquid crystal fluid.

The solar energy 6 transmitted to the cover 9 is correspondingly diverted or scattered and partially retransmitted outwardly into the environment. The liquid crystal material 18 thus acts as an energy shield over the absorber plate element and particularly layer 8. The dynamic scattering effect increases with the applied voltage and thus changes the cover 9 from a highly transparent state or condition to a translucent or opaque condition associated with reduced transmitted solar energy 6. With a voltage of approximately 40 volts, the liquid crystal material 18 converts to a highly reduced energy transmitting state. The energy transmittance of material 18 may therefor be varied with a corresponding variation in heat input to the absorber layer by continuously monitoring a system parameter and controlling the voltage applied to material 18.

In the illustrated embodiment of the invention, a regulated voltage is applied to the material 18 as controlled by the temperature controller in response to the output of the temperature of the liquid leaving the collector as reflected in the temperature sensor. For example, the system may be readily constructed such that as the discharging liquid from the collector passageway 12 approaches its boiling point, regulated output voltage increases to reduce the transmittance of material 18 and thereby reduce the solar energy 6 applied to absorber 8. This reduces the heating of the liquid in the passageways 12 and may maintain a maximum temperature condition. The power required to modulate the liquid crystal fluid 18 from a transparent state to a complete opaque state is only on the order of microwatts per square centimeter of the cover. Thus the total energy consumed will be minimal under even the most severe conditions and the like.

Obviously, any other sensing and/or control means can be readily provided. For example, the sensing unit could be connected directly to the absorber surface 8. Alternately, a manual or automated control may be connected to impress and remove the voltage from the cover 9 and thereby provide a periodic on-off type of control to limit the total energy transmitted. A control responsive to other abnormal conditions within the system such as a termination of flow in system, pump failure or the like.

In the course of the development of the transmittance control, the inventor found that the thin metal oxide film on the cover sheet also functioned to increase the absorber temperature. Thus, in a comparative test a cover was formed without the film on the outer sheet and compared to a corresponding collector with a tin oxide film. The temperature of the absorber with film was higher than that of the first without the oxide film. Thus, in one aspect of this invention, an improved collector may be formed by employing any outer cover including a metal oxide film such as the previously identified tin oxide, indium oxide and the like.

Although illustrated in a single, simple cover collector flat plate assembly, the same concept is obviously applicable to other collector systems. The present invention can, of course, be suitably applied to any other suitable collector adapted to incorporate a variable transmittance material. The invention employing the liquid crystals or like material which is responsive to an electric field applied thereacross provides a simple, reliable and relatively inexpensive structure for effectively suppressing formation of damaging high temperature conditions within the collector and/or associated solar energy collecting system while minimizing the necessity for auxillary equipment and control.

Various modes of carrying out the invention are contemplated as being within the scope of the following claims, particularly pointing out and distinctly claiming the subject matter which is regarded as the invention.

I claim:

1. A solar energy collector apparatus comprising an energy absorbing means for absorbing solar energy, and a controllable energy transmittance material overlying the absorbing mean, and control means connected to said transmittance material for controlling the energy transmittance level of said transmittance material for varying the transmission of energy to said absorbing means.

2. The collector apparatus of claim 1 including means to sense the temperature state of said absorbing means and connected to said control means to control the transmittance of said transmittance material.

3. The solar energy collector apparatus of claim 1 wherein said transmittance material is a liquid crystal material layer mounted in spaced overlying relation to said absorbing means, said control means being an electrical voltage means including conductive means secured to the opposite surface of the layer.

4. The solar energy collector of claim 1 wherein said transmittance material is a nematic mixture, said control means includes a voltage means connected across said transmittance material, and a voltage control means is connected to said voltage means for controlling the transmittance of said transmittance material.

5. A solar energy collector, comprising an energy absorbing means having an outer exposed surface for absorbing solar energy, an outer cover means mounted in overlying relation to said absorbing means, said cover means including a layer of a transmittance change material having an energy transmittance related to an electrical potential impressed across the layer, and a variable voltage means connected to said transmittance layer for controlling the transmittance of said layer.

6. The solar energy collector apparatus of claim 5 wherein said absorbing means is a plate-like element, said layer of material providing dynamic scattering of solar energy in response to a voltage impressed across said layer.

7. The solar energy collection of claim 5 wherein said cover means comprises a pair of closely spaced transparent plates mounted in spaced relation to said absorbing means, conductive means on the opposed faces of said plates, sealing means secured to said plates and defining a sealed chamber therebetween, said material filling said chamber, and said voltage means being connected to said conductive means.

8. The solar energy collector apparatus of claim 7 wherein said absorbing means includes a transfer means for selective and intermittent withdrawal of absorbed solar energy from the absorbing means and said voltage means includes a voltage regulator means connected to the conductive means, and means monitoring the operating status of the absorbing means to limit the temperature in the transfer means.

9. The solar energy collector apparatus of claim 5 including means sensing the temperature of the absorbing means and controlling the output of said voltage means to limit the solar energy transmitted to the absorbing means and thereby limit the temperature of the absorbing means.

10. A flat plate solar collector apparatus comprising an inner absorbing and transfer plate means and an outer cover secured in spaced overlying relationship to said transfer plate means, said cover including a pair of transparent cover plates mounted in close spaced relation to said plates, conductive films of an energy transparent material on the opposed faces of said cover plates, sealing means secured to said plates and defining a sealed chamber therebetween, controlled transmittance material means filling said chamber and having a varying energy transmittance in accordance with an electric field directed from one cover plate to the other, and voltage supply connector means secured to said conductive means.

11. The solar energy collector apparatus of claim 10 wherein said conductive films are formed of materials selected from tin oxide, indium oxide and mixtures including at least one of said materials.

12. The solar energy collector apparatus of claim 10 wherein said transmittance material is a liquid crystal nematic mixture producing dynamic scattering directly related to the voltage level.

13. A solar energy collector, comprising an energy transfer control means mounted as an external wall, said control means including a layer material having a solar energy transmittance related to the electrical voltage applied across the layer, a voltage source is connected across said transmittance layer for controlling the transmittance.

14. A solar energy collection and storage apparatus, comprising a flat plate solar collector having an inner transfer plate and an outer transparent plate mounted in spaced relation to said transfer plate, conductive means on the opposed faces of said plates, sealing means secured to said plates and defining a sealed chamber therebetween, liquid crystal means filling said chamber, control power supply means connected to said conductive means.

* * * * *